US000001135H

United States Statutory Invention Registration [19]

[11] Reg. Number: H1135

Schwartz [43] Published: Feb. 2, 1993

[54] TONER APPLICATION AND CIRCULATION APPARATUS

[76] Inventor: Vernon R. Schwartz, S. 4120 Linke Rd., Greenacres, Wash. 99016

[21] Appl. No.: 518,694

[22] Filed: May 3, 1990

[51] Int. Cl.[5] ..... B05C 11/00

[52] U.S. Cl. ..... 118/689; 118/690; 118/693; 118/694; 118/602; 118/661; 137/263; 137/566; 137/567; 137/571

[58] Field of Search ..... 118/689, 690, 693, 694, 118/602, 661, 662, 212, 244, 261; 222/67; 137/263, 566, 567, 571, 605; 417/417, 481, 482, 545, 547, 554

[56] References Cited

U.S. PATENT DOCUMENTS

| | | | |
|---|---|---|---|
| 2,262,573 | 11/1941 | Bender | 137/566 |
| 3,737,338 | 6/1973 | Kabelitz | 118/689 |
| 4,047,853 | 9/1977 | Huckaby | 417/554 |
| 4,265,375 | 5/1981 | Flider | 417/554 |
| 4,457,258 | 7/1984 | Cocks | 118/698 |
| 4,482,241 | 11/1984 | Moraw et al. | 188/661 |
| 4,487,340 | 12/1984 | Shaffer | 417/545 |
| 4,524,801 | 6/1985 | Magnasco et al. | 137/567 |
| 4,547,128 | 10/1985 | Hayes | 137/566 |
| 4,615,295 | 10/1986 | Wittkopf | 118/251 |
| 4,686,936 | 8/1987 | Chow | 118/661 |
| 4,867,775 | 9/1989 | Cain et al. | 118/689 |
| 4,985,732 | 1/1991 | Landa et al. | 118/662 |

FOREIGN PATENT DOCUMENTS

| | | | |
|---|---|---|---|
| 2162586 | 2/1986 | United Kingdom | 417/554 |

*Primary Examiner*—Richard D. Lovering
*Assistant Examiner*—Joseph D. Anthony

[57] ABSTRACT

A toner solution circulation apparatus controls the application, concentration, and circulation by pumping of toner solution for an electrostatic imaging system by using a vacuum to draw toner solution, which is selectively mixed with concentrated toner solution and clear isopar, from a mixer manifold, and by using the rotating action of an applicator roll to pump, circulate, and mix toner solution, pigment, and isopar. A float and pivot block assembly maintains the correct isopar solution level in the chamber.

A tube pump apparatus, having two tubes, one inside the other with sliding seals between the tubes, each tube having a ball type check (foot) valve at its end is submerged in concentrated toner solution in a supply container or bottle, to add pigment to the toner soltuion.

The cycle time of the pump stroke is monitored by a Hall effect sensor.

8 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TONER APPLICATION AND CIRCULATION APPARATUS

FIELD OF THE INVENTION

This invention relates to an apparatus for controlling the application, concentration, and circulation of toner material such as used in electrostatic imaging systems.

BACKGROUND OF THE INVENTION

Description of the Prior Art

In a contact printing electrostatic imaging system producing one or more colors, each color having its own station, paper is passed over a charging head containing a large number (for example, in one system approximately 13,000) of electrodes (or nibs). Negative charges are placed at selected locations on the paper by selected electrodes in accordance with the location of an image to be applied. The paper is then passed over part of a curved side of a rotating applicator roll covered with toner solution. (The paper passes over the curved side of the roll while the roll is turning in a direction opposite to the motion of the paper.) The rotating applicator roll has previously been covered with a bath of positively charged toner particles (colored pigment) suspended in a clear isopar (isoparaffinic material). The charged pigment is attracted to the oppositely charged areas, forming a latent image, on the paper as the paper passes over the applicator roll. At locations where toner pigment is neutralized (positive meets negative) the pigment is retained and the latent image is developed. The surface of the paper carrying the toner solution is quite wet at this point. The undeveloped toner solution is scavenged from all areas of the paper by means of a vacuum applied to the paper by a vacuum channel. From the vacuum channel the paper passes to the next station, if any, where another color is applied to the paper.

In forming a color image, a total of four stations are required to apply four different colors to the paper in order to produce the full spectrum of colors.

In the prior art, the applicator roll has parallel spiral grooves milled into its surface, each groove spirally encircles the roll with a predetermined pitch along the length of the roll. The grooves occupy a selected percentage (typically 50%) of the circumferential surface of the roll. Each groove acts as a reservoir supplying toner solution to the paper, encouraging a maximum density development of the latent image. Once the paper contacts the surface of the roll nearly all of the toner solution is removed from the surface of the roll. However, some "old" (pigment depleted) toner still remains in the grooves. It is desirable to remove and/or refresh the "old" toner solution in the grooves to promote maximum image development and to uniformly and fully develop images.

In the prior art, the grooves in the applicator roll are purged of "old" toner solution and the surface, including the grooves, of the roll are recoated with new toner solution, as a result of toner solution being forcibly directed against the underside of the turning applicator roll which is located within a toner station tank.

The toner solution is forced against the underside of the roll through a slot orifice manifold assembly. The manifold assembly is a rectangularly shaped distribution channel having an elongated slot along its top through which toner solution is forced against the roll under pressure from a large external pump. The pump circulates toner solution from a toner solution reservoir bottle through an aspirator to the slot orifice manifold assembly and onto the applicator roll. Excess toner solution then falls from the roll or the paper into the tank and then is routed by tubing back to the toner solution reservoir bottle. The slot orifice manifold assembly also contains a slotted distribution tube to assist in equalizing the pressure along the length of the manifold slot.

Flow of toner solution through the aspirator creates a vacuum which is connected by tubing to the vacuum channel which assists in removing the last remnants of undeveloped toner solution from the paper, as the paper passes over the vacuum channel.

The circulating pump is sized to impinge toner on the bottom of the applicator roll at a high enough pressure to displace the "old" toner solution present in the roll's spiral grooves. This pump assures that a constant supply of freshly circulated and mixed toner solution coats the surface of the roll.

Typically, this pump is approximately 5" in diameter and 12" long and this is fairly bulky. This pump draws a substantial current (about 3 amps in one system), produces a large amount of heat, and is relatively expensive and noisy. Also, connections to and from the pump require a substantial amount of large size tubing to circulate the toner solution in the circulating system. These large pumps have, in the past, required frequent service.

The toner solution is typically a factory prepared premix having 2% solids (i.e., 2% pigment) and 98% isopar (i.e., 98% clear carrier fluid).

In the prior art, toner solution is replenished as follows. As the paper to be printed is passed over the charging head the number of electrode locations (dots) energized for printing are counted. The amount of toner pigment used to develop (print) a given number of energized locations (dots) is known. Once a predetermined number of electrode locations (dots) have been energized, a predetermined metered amount of premix (having the same amount of pigment as was used to print the previously counted dots) is added to the circulating system as make-up to maintain the amount of toner pigment in the circulating system. However, during the printing process, the use of pigment and carrier in the toner solution is not uniform. The use, and resulting loss, of the carrier or isopar fluid when compared to the use, and loss, of toner pigment for a particular image, generally, does not match the ratio of carrier or isopar fluid to pigment in the pre-mix make-up solution (i.e., a relatively blank image uses more isopar than average, while a full image uses less isopar than average). Historically, this mismatched use eventually depletes the isopar carrier faster than the pigment is depleted thereby causing the concentration of pigment in the toner solution to increase. The concentration increases until the image developed on the paper becomes distorted and is not of good quality. The remaining toner solution, $\frac{1}{3}$ to $\frac{1}{2}$ of its original volume, is now judged to be unfit for further use and must be discarded and a fresh new supply substituted. Another problem is that the substantial amount of toner solution being discarded should be disposed of as hazardous waste.

Also, the prior art toner system requires a large removable sliding drawer in order to facilitate removal of the large toner bottles.

SUMMARY OF THE INVENTION

This invention provides a toner solution circulation apparatus which controls the application, concentration, and circulation of toner solution for an electrostatic imaging system In accordance with this invention, a system is provided which selectively dispenses and mixes appropriate quantities of concentrated toner solution (pigment) and clear dispersant solution (isopar carrier) as required to maintain a predetermined concentration of pigment in the toner solution.

Also, a toner purging and circulating system is provided which causes a rotating partially immersed applicator roll arranged in close proximity to a restrictive baffle plate to create a pumping action. The pumping action refreshes and purges toner solution from grooves on the surface of the roll, coats the surface of the roll with toner solution, and pumps toner solution over the top of the baffle plate to circulate toner solution, without the use of an external pump.

In one embodiment of this invention, toner solution is held in a main toner station (or solution) tank. A fixed baffle plate (nonmovable barrier) or "leaf" separates the main toner solution tank into two chambers, a first, mixed, or "new" toner solution chamber or "new" side and a second, recirculating, or "old" toner solution chamber or "old" side.

The rotating applicator roll having grooves (or slots) in its surface is positioned horizontally above the "new" chamber adjacent to the baffle plate so that a lower portion of the roll is immersed in the toner solution.

The grooves in the surface of the applicator roll are spiraled about the roll like large shallow threads, in one embodiment having a pitch of 3.5 inches, and the roll rotates at a selected rate, in one embodiment 325 RPM.

The top portion of the baffle plate is bent in the direction of the roll's rotation so as to be almost tangent to the face of the roll. The end of the bent portion points in the direction of the roll's rotation, leaving a very small gap (or nip) between the baffle plate and the roll just above the operating liquid level in the tank. In one embodiment, the baffle plate is spaced between 10 and 15 thousands of an inch from the roll's surface. The leaf can be adjusted relative to the surface of the applicator roll to vary the thickness of the gap between the leaf and the applicator roll.

Toner solution fills the grooves and coats the surface of the roll as the roll rotates through the "new" toner solution chamber of the tank. As the coated portion of the roll rotates upwards past the baffle plate and contacts a paper being drawn across its top, nearly all of the toner solution on the surface and in the grooves of the roll is deposited on the paper as it passes across the top of the roll. As toner solution is deposited on the paper a latent image is developed. Some "old" toner solution remains in the grooves after most of it has been deposited on the paper. As the roll rotates further, grooves containing "old" toner solution are again immersed in the "new" toner solution chamber of the tank, however, to assure that there is no deleterious effect on printing because of the "old" toner solution and to assure that the grooves are refilled with "new" toner solution, the grooves must be purged with "new" toner solution. To purge the "old" toner solution from the grooves, the circumferential velocity of the roll is utilized to create fluid pressure and thus pump "new" toner solution through the grooves of the roll to purge the grooves.

As the roll rotates, a layer of toner solution adjacent to its surface moves with the surface of the roll and is progressively squeezed to the thinness of the gap between the surface of the roll and the baffle plate. Consequently, toner solution entrained by the rotating applicator roll is squeezed into this gap and in being so squeezed creates a fluid pressure purging the grooves in the surface of the applicator roll (i.e. replaces the "old" toner solution in the grooves with "new" toner solution). Toner solution carried through the gap in excess of what adheres to the surface of the applicator roll is flung off the roll and falls into the "old" solution chamber of the main tank. Thus rotation of the applicator roll pumps toner solution from the "new" toner solution chamber to the "old" toner solution chamber thereby helping to create a higher level in the "old" solution chamber than in the "new" solution chamber.

A small integral liquid pump (which can pass both gas and liquid without damage), requiring substantially less current and generating significantly less noise than the circulating pump in the prior art, creates a vacuum and circulates toner solution from the vacuum channel and the "new" solution chamber of the tank through a vacuum controller manifold located on the bottom of the "new" solution chamber of the toner station tank through a mixer manifold and the pump to the "old" solution chamber of the tank. The vacuum created by the pump is controlled by the restrictive metering action of a small metering orifice in the vacuum controller manifold. The metering orifice is ported to draw toner fluid from the "new" solution chamber of the toner station tank. Normal pump flow exceeds the metering orifice capacity, therefore a vacuum is created by the pump suction. This vacuum transferred to the pump side of the metering orifice is not completely relieved by the metering orifice. The unrelieved vacuum is conducted from the vacuum controller manifold via two hoses to each end of the vacuum channel assembly to draw air and undeveloped toner solution from the vacuum channel. This air/toner solution mixture drawn from the vacuum channel is combined with the toner liquid drawn through the vacuum metering orifice from the "new" solution chamber to form a mixed phase solution of approximately 20% air and 80% toner solution as it is passed through the mixer manifold on its way to the liquid pump. This air/toner solution then flows from the pump to a return port located at one end of the "old" side of the toner station tank. Since the toner liquid being pumped is still mixed phase there are air bubbles emerging from the connection which are harmlessly dissipated at the liquid's surface.

Toner solution from the fluid pump plus "new" toner solution pumped by the pumping action of the applicator roll/baffle pump combine to raise the liquid level on the "old" side of the toner station tank higher than the level on the "new" side. In turn, the higher liquid level provides a head difference forcing toner fluid through one or more apertures, preferably two or more, located in the end of the baffle plate away from the return port separating the "old" and "new" side in the toner station tank. As the pumped toner solution moves across the "new" chamber to the apertures it mixes with the discarded toner solution just pumped through the applicator/baffle plate nip. This mixing path maximizes the amount of mixing action experienced by the toner solution so that a relatively uniform toner solution concentration flows from the "old" side to the "new" side through the apertures.

A float and pivot block assembly is provided in the "old" solution chamber of the main tank to sense a low liquid level in that chamber. A float arm includes a flapper block located just above an air bleed orifice. When the toner liquid level falls below normal the float drops causing the flapper block to drop and close the air bleed orifice. The air bleed orifice which is electrically conductive is attached to the end of an electrically grounded vent tube which is connected to a lower chamber of the mixer manifold assembly. The electrical connections are used to connect to alarms.

The mixer manifold assembly is comprised of an upper and a lower chamber connected by a restrictive orifice. The mixed phase toner solution coming from the vacuum controller manifold passes through a mixer manifold upper chamber on its way to the liquid pump. This toner solution has a predetermined vacuum pressure, of approximately 35 inches of isopar, at the vacuum controller. The orifice connecting the upper and lower chambers of the mixer manifold restricts the flow of fluid across it enough to prevent the loss of a significant amount of vacuum in the upper chamber even if the lower chamber is open to atmosphere.

Also ported into the upper chamber is tubing connected to the outlet of a "metering type" tube pump, or solenoid pump, which provides a metered amount of concentrated toner solution (pigment) from a source of toner concentrate. This configuration ensures that the concentrated toner solution (pigment) introduced into the system will be mixed with the flow of relatively normal concentration toner solution continuously passing through the upper chamber, before entering the "old" side of the toner station tank where further mixing occurs.

The lower chamber of the mixer manifold assembly has two connections; one connected by the vent pipe to the float controlled air bleed orifice, the other connected to an isopar (clear carrier) dispensing manifold. A normal, or high, toner solution level in the "old" side keeps the float raised which keeps the air bleed orifice open. When the orifice is open, air at atmospheric pressure passes through the orifice to the lower mixer manifold chamber. This air introduced into the lower chamber substantially reduces the vacuum in the lower chamber relative to the upper chamber. A lowering of the liquid level in the "old" side of the toner station tank causes the float to move lower. At a predetermined tank level the declining tank liquid level causes the float to close the air bleed orifice. This closure causes the vacuum in the lower mixer manifold chamber to increase until it reaches the same vacuum level that exists in the upper mixer manifold chamber (approximately 35" of isopar). This increased vacuum draws clear isopar from an isopar manifold/reservoir into the lower manifold chamber, through the orifice between manifold chambers, into the upper mixer manifold chamber, and through the pump into the "old" side of the solution station tank. Conversely, raising the toner station tank "old" side liquid level will raise the float thus opening the air bleed orifice and allowing the vacuum in the lower chamber to be replaced by air at approximately atmospheric pressure, thereby stopping the flow of isopar to the mixer manifold chambers.

The engagement of the float block with the air bleed orifice acts as the closure of an electrical switch. The time of closure is compared by a timer with a predetermined time setting. If the float switch closure lasts longer than the predetermined time setting a signal is generated signifying an isopar "out", or trouble condition, and activating an alarm.

When developing toner (printing) on paper the number of electrode locations (dots) charged for imaging are counted, as in the prior art, and when the total number counted reaches a predetermined number, a pump signal is generated so that a predetermined amount of a concentrated toner solution (in one example: 30% pigment, 70% isopar) is pumped into the upper chamber of the mixer manifold by a tube pump, or other solenoid type pump. The tube pump supplies a measured amount of concentrated toner solution in response to each pump signal. The tube pump is submerged in concentrated toner solution in a supply container or bottle.

In one embodiment, the tube pump consists of two tubes, one tube inside the other with sliding seals between the tubes, each tube having a ball type check (foot) valve at its end. To pump fluid, a D.C. (direct current) coil is energized causing the inside tube to rise and draw concentrated toner solution from the supply container into the space between the end of the inside and outside tubes (pump chamber). When the coil is de-energized a return spring presses the inside tube back to its low position forcing a portion of the solution in the pump chamber through the inside tube's foot valve into the inside tube While at the time time forcing solution inside the inside tube out of the pump through holes in the side of each tube. Further pump signals repeat this cycle.

The cycle time of the pump stroke is monitored by a Hall device sensor. If the concentrated toner solution in the supply bottle is depleted or the pump is malfunctioning the pump will not cycle the liquid solution but will cycle gaseous air having a flow resistance substantially less than the liquid solution, which will cause a substantially shorter stroke cycle. If a short stroke cycle is sensed, indicating that air is in the pump, an alarm will be sounded.

This toner application and circulation system can be repeated for each color of a multi-color imaging system.

This invention will be more fully understood in light of the following detailed description taken together with the following drawings.

DESCRIPTION OF THE INVENTION

Figure 1A:
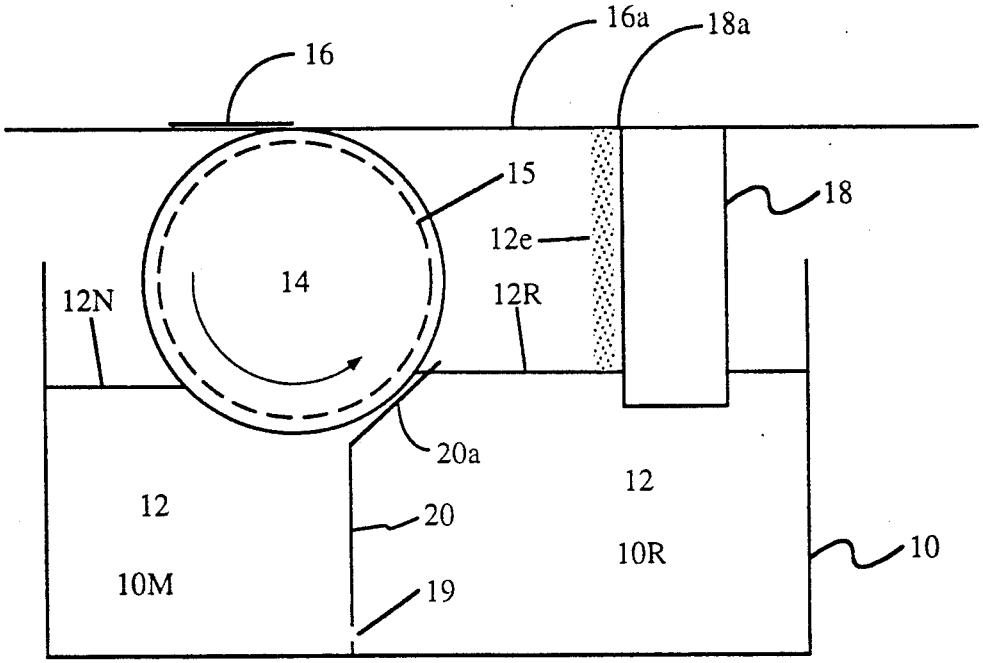
FIG. 1*a* is a side sectional view of a main tank 10 in which an applicator roll 14 and vacuum channel 18 are disposed, wherein both mixed "new" and recirculating "old" toner solutions are provided, in accordance with this invention.
Figure 1B:
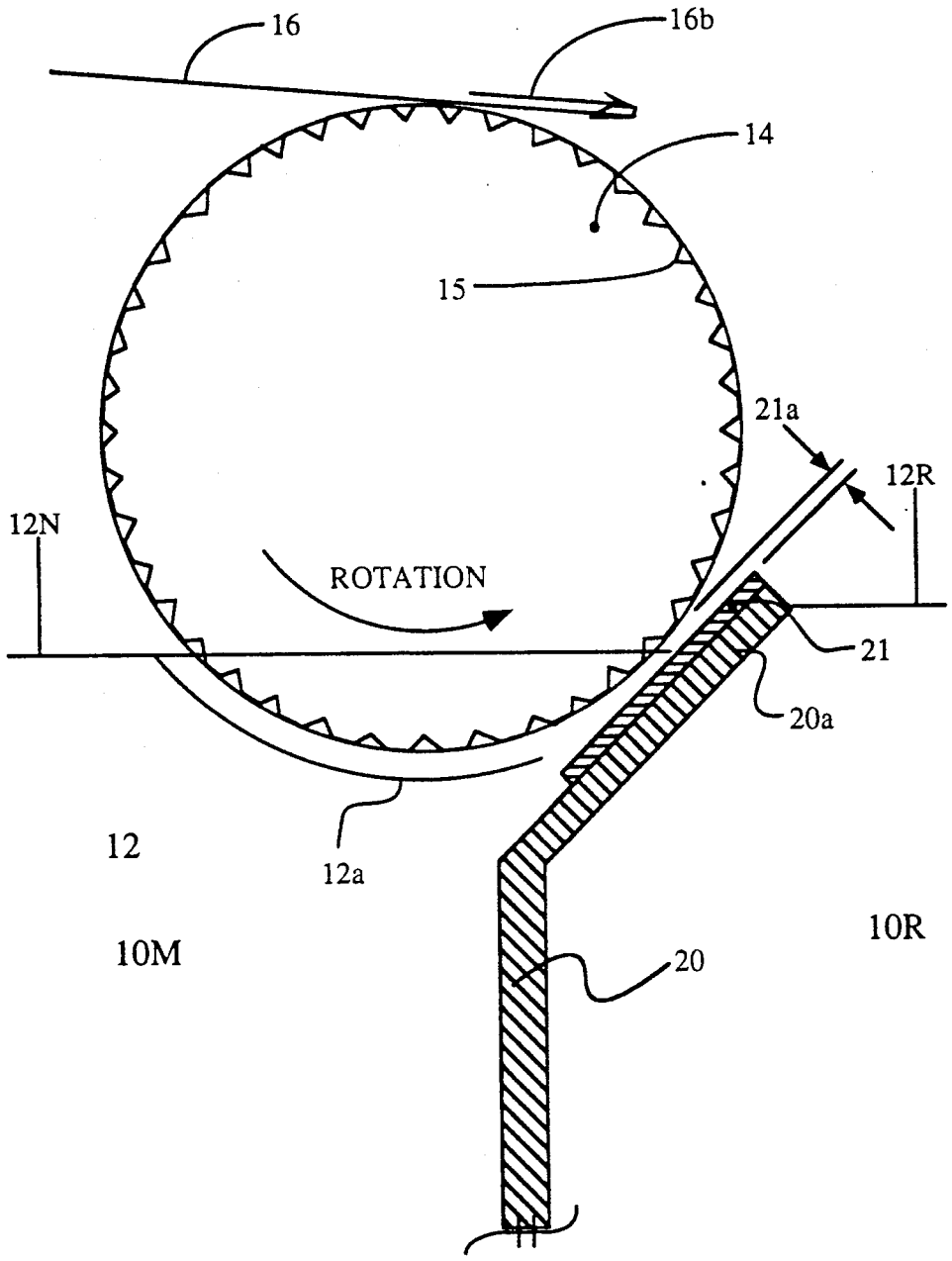
FIG. 1*b* shows the details of the top portion 20*a* of the nonmovable leaf 20 (between the two chambers of the main tank as this leaf approaches the surface of the applicator roll 14)
Figure 2:
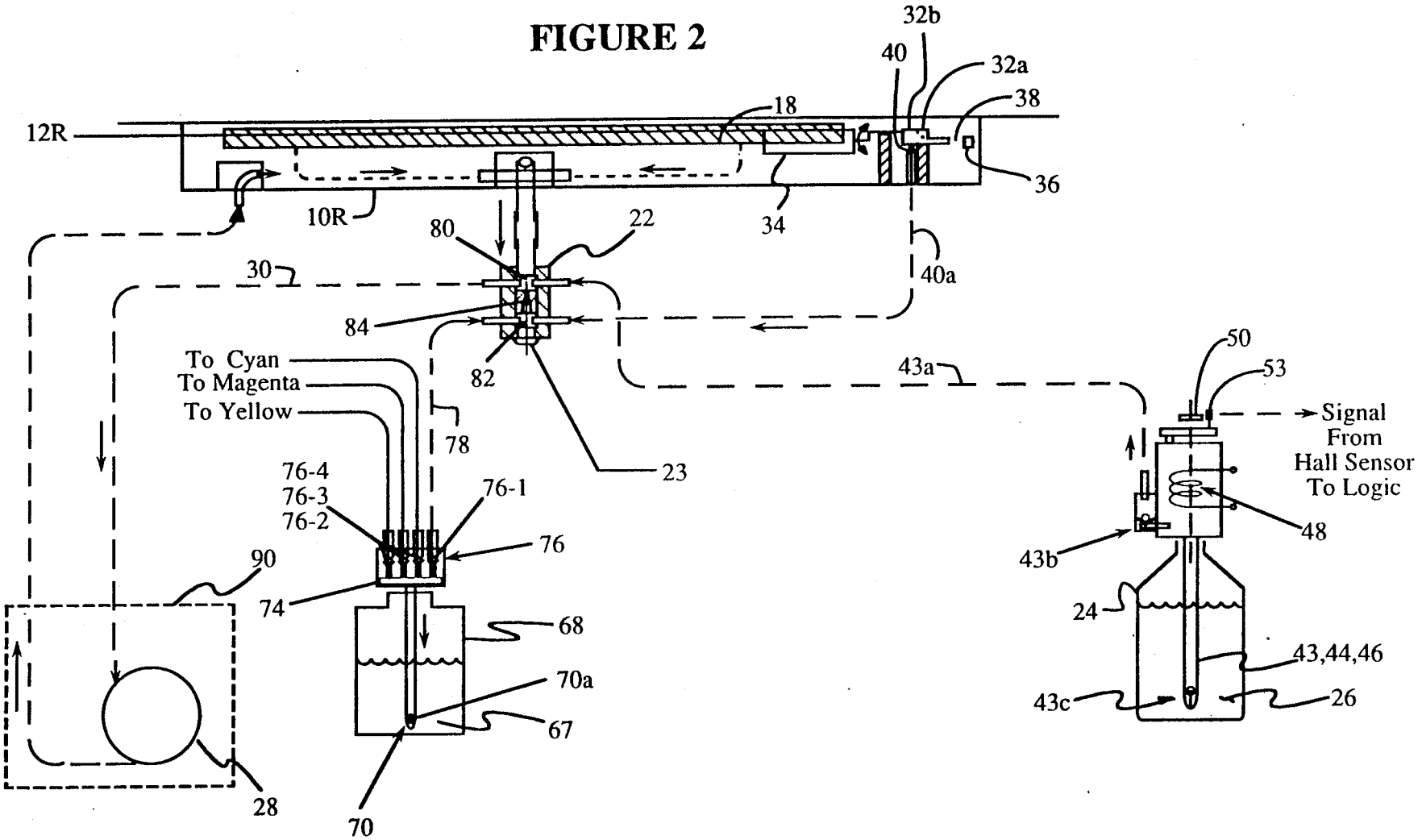
FIG. 2 is a schematic diagram of a toner solution mixing, circulating, and make-up apparatus using a fluid pump 28 in accordance with this invention.

With reference to FIGS. 1*a*, 1*b*, and 2, a toner solution circulation system includes a main tank 10 having two chambers, a mixed, mixing, "new" solution chamber or "new" side 10*m* and a recirculating "old" solution chamber or "old" side 10*r*, separated by a fixed baffle 20. Toner pigment, carried in suspension in the toner solution, is manufactured to retain an inherent positive electrical charge. Each tank chamber contains a mixture of toner solution 12. A "new" chamber solution level 12*n* and an "old" chamber solution level 12*r* exist on their respective sides of the baffle 20.

An applicator roll 14 (FIG. 1*a,b*) is mounted at a predetermined level within the confines of the mixed chamber 10*m* of the tank 10 so that a lower portion of the roll 15 is immersed in the toner solution 12. The applicator roll 14 is rotated in a counterclockwise direction (as shown in FIG. 1*a,b*) predetermined rate, preferably constant, by a motor (not shown). The applicator roll 14, which may be made of steel by way of example, having a surface runout of approximately 0.0005", is configured with spiral slots or grooves 15, having a width of approximately 0.050" and a depth of a similar dimension, that have been milled into its circumferential surface similar to shallow threads in a large threaded rod each having a pitch of approximately 3.5 inches. In one embodiment, about 50% of the circumferential surface area of the roll 14 consists of these spiral slots or grooves 15. The lands 15*a* between grooves are approximately the same width as the grooves 15. The corners of the roll between the lands and the grooves are made as sharp as possible, in one example having an angle of approximately 80 degrees, to make the field gradient, generated by the roll lands 15*a* passing close to the surface of the paper 16, as effective as possible.

During operation of the apparatus, the applicator roll 14 is rotated in the "new" toner solution and a boundary layer of toner solution 12*a* is formed near the surface of the roll 14 entraining toner solution 12 to move with the surface of the roll 14 as it rotates. The moving boundary layer of toner solution 12*a* generally matching the surface speed of the roll 14 extends about 0.025 inches from the surface of the roll for an applicator roll with a surface speed of approximately 1430 in./min having a diameter of 1.400 in. rotating at 325 rpm. The effect of the rotating roll 14 on entrainment of the toner solution in the mixing chamber 10*m* decreases rapidly as the distance from the surface of the roll increases.

A baffle plate or leaf 20 is located in the main tank 10 and has an exposed portion 20*a* bent at a selected angle from the vertical so as to be parallel along the face and tangent to the surface of applicator roll 14. The exposed portion 20*a* points in the direction of rotation of roll 14. The exposed portion 20*a* is adjacent the lower portion of the applicator roll 14 that is immersed in the toner solution 12. The baffle plate 20, which may be made of aluminum or any other suitable material, having a thickness of approximately 0.040 inches, separates the main tank 10 into two chambers 10*m*, 10*r*. The plate or leaf 20 has one or more apertures 19, approximately 5/16 in. in diameter, preferably near the bottom of the tank (approximately ⅛ from the bottom of the tank, and each aperture is preferably located approximately one inch from any other aperture) that allow the "old" toner solution to flow from the recirculating tank chamber 10*r* to the mixed tank chamber 10*m* where the new toner solution coats the immersed portion of the roll 14. The space between the angular portion 20*a* of the plate 20 and the surface of the roll 14 defines a narrow gap (nip) 21*a*, of about 0.010–0.015 inches. The gap is adjustable by means of oversize mounting holes in a flange at the base of the baffle which allow the baffle 20 to be moved relative to the applicator roll 14 to obtain the desired gap. The gap 21*a* is approximately one-half of the thickness of the layer of the entrained fluid moving at the speed of the roll surface, i.e. 0.010–0.015 inches. The moving fluid creates a pressure build-up at the baffle nip gap 21*a*.

As the boundary layer of toner solution 12*a* rotates with the applicator roll 14, it creates a pressure build-up at the baffle nip gap 21*a*, and produces a "pumping" action whereby toner solution in the boundary layer 12*a* is squeezed by the angular portion 20*a* of the leaf 20 into gap 21*a* and into the spiral grooves 15 in the surface of applicator roll 14. The "old" toner fluid in the grooves is displaced by fluid pressurized by the turning roll, thereby purging the grooves of "old" solution and replacing it with "new" mixed solution drawn from the "new" toner solution tank chamber 10*m*.

The surface and grooves of the applicator roll 14, now carrying new toner solution, rotate up and pass over the paper 16 moving across the top of the roll which contains negative charges in those regions where images are to be formed. Before reaching the paper, any toner solution that is carried past the exposed portion 20*a* of the leaf 20 as the roll 14 turns and falls from the roll 14, falls on the recirculating side of the leaf 20 in the recirculating tank chamber 10*r*. The paper 16 moves along a paper path 16*a* in the direction of arrow 16*b*. Tension on the paper as the paper passes across the roll causes nearly all of the toner solution on the surface lands of the roll to be displaced, and much of the toner solution in the grooves to be attracted to the paper. Most of the toner solution ends up on the underside of the paper, or falls off the paper and roll into "old" chamber 10*r* of tank 10.

When toner solution falls into the recirculating tank chamber 10*r* it causes the recirculating tank solution level 12*r* to rise. As more "new" toner solution is "pumped" past the baffle 20, the difference between solution levels 12*n*, 12*r* across the baffle 20 increases. As a result of this difference in pressure, the "old" toner solution in the recirculating tank chamber 10*r* flows through the apertures 19 into the "new" solution chamber 10*m*. The majority, approximately ½ gallon per min, of toner solution 12 circulating in this system is circulated by the applicator roll 14 carrying toner solution 12 from the mixed solution chamber 10*m* over the baffle 20 into the recirculating solution chamber 10*r* and back to the mixed tank chamber 10*m* through the apertures 19 in the baffle 20.

The paper 16 is selectively charged to a negative polarity by electrodes or nibs of a head assembly (not shown) to form a latent electrostatic image. The paper 16 is transported at a given rate, approximately one-half inches per second, past the roll 14 while in rubbing contact with the roll 14. Toner pigment, which is positively charged, is carried on the surface and in the grooves of the roll 14 and is attracted by virtue of its positive charge to negatively charged points on the paper 16 in contact with the applicator roll 14. An electric field (field gradient), comprised of static electricity, exists on the surface of the applicator roll. Variations in the field gradient, caused by the passage of the grooves and lands on the surface of the roll alternatively across the charged paper, cause the pigment particles in the toner solution in and on the grooves and lands of the roll to be agitated to enhance the development of the image on the paper, as more and more of the microscopically sized pigment particles come in contact with the charged areas on the paper (approximately 85 field gradient cycles are applied to any point on the paper to insure complete development). As positively charged toner pigment particles in the toner solution contact the negatively charged points on the paper the pigment is developed and becomes fixed on the paper in the pattern of the image defined by the discrete charged areas. The paper 16 carrying the toner solution 12 is wet after contacting the applicator roll 14. Undeveloped toner solution still on the paper needs to be removed. The paper 16 containing undeveloped toner solution moves across a vacuum channel 18 whose leading edge mechanically squeegees the paper and then by vacuuming pulls off any remaining solution.

The vacuum channel 18 (see FIG. 2) is disposed in the recirculation tank chamber 10*r*. The leading edge of the channel 18 mechanically removes a large part of the excess toner solution 12*e* from the paper 16 as the paper initially starts across the vacuum channel 18. In one embodiment the vacuum channel 18 is a rectangular box-shaped device with an open top across which the paper 16 passes. It is slightly less wide than the paper, and can consist of a bar of steel into which a slot ¼" wide is centrally cut leaving an edge land thickness of about 0.030 inches all around. A vacuum is ported into the slot to draw the undeveloped toner solution from the paper 16 into the vacuum channel. Once the paper 16 passes the squeegee edge 18*a* of the vacuum channel, it crosses the open top of the channel 18, and when the channel 18 is completely covered an air seal is created. The vacuum in the channel 18, created by a fluid pump (not shown in FIGS. 1*a* and 1*b*), causes air to flow between the edges around the vacuum channel and the paper. Air flow across the interface between the channel and the paper removes any residual toner solution from the paper 16.

In operation, when a heavy concentration of toner fluid has been applied to the paper, the excess toner fluid 12*e* runs down into the recirculating toner chamber 10*r*. In addition, the vacuum channel 18, which is maintained at vacuum by a pump 28 (FIG. 2), draws any undeveloped toner solution from the paper 16 into the vacuum channel 18.

As shown in FIG. 2, vacuum in the vacuum channel 18 is produced by a small fluid pump 28 which sucks air and toner solution from the vacuum channel 18 through a vacuum controller manifold 42 in the bottom of the "new" side of the toner station tank 10*m* through a mixer manifold 22. The mixer manifold 22 is also ported 22*a, b, c, d* to receive and deliver concentrated toner solution 26, clear isopar solution 67, and air from several other sources to be selectively mixed with the fluid (toner solution, or air, or a combination thereof) circulated by the fluid pump 28. From the fluid pump 28, the mixed phase fluid is pumped to one end of the "old" solution chamber 10*r* and thoroughly mixes with the toner solution 12 in that chamber 10*r*, before moving through the apertures 19 in the baffle 20 to the "new" side 10*m*.

Figure 5:
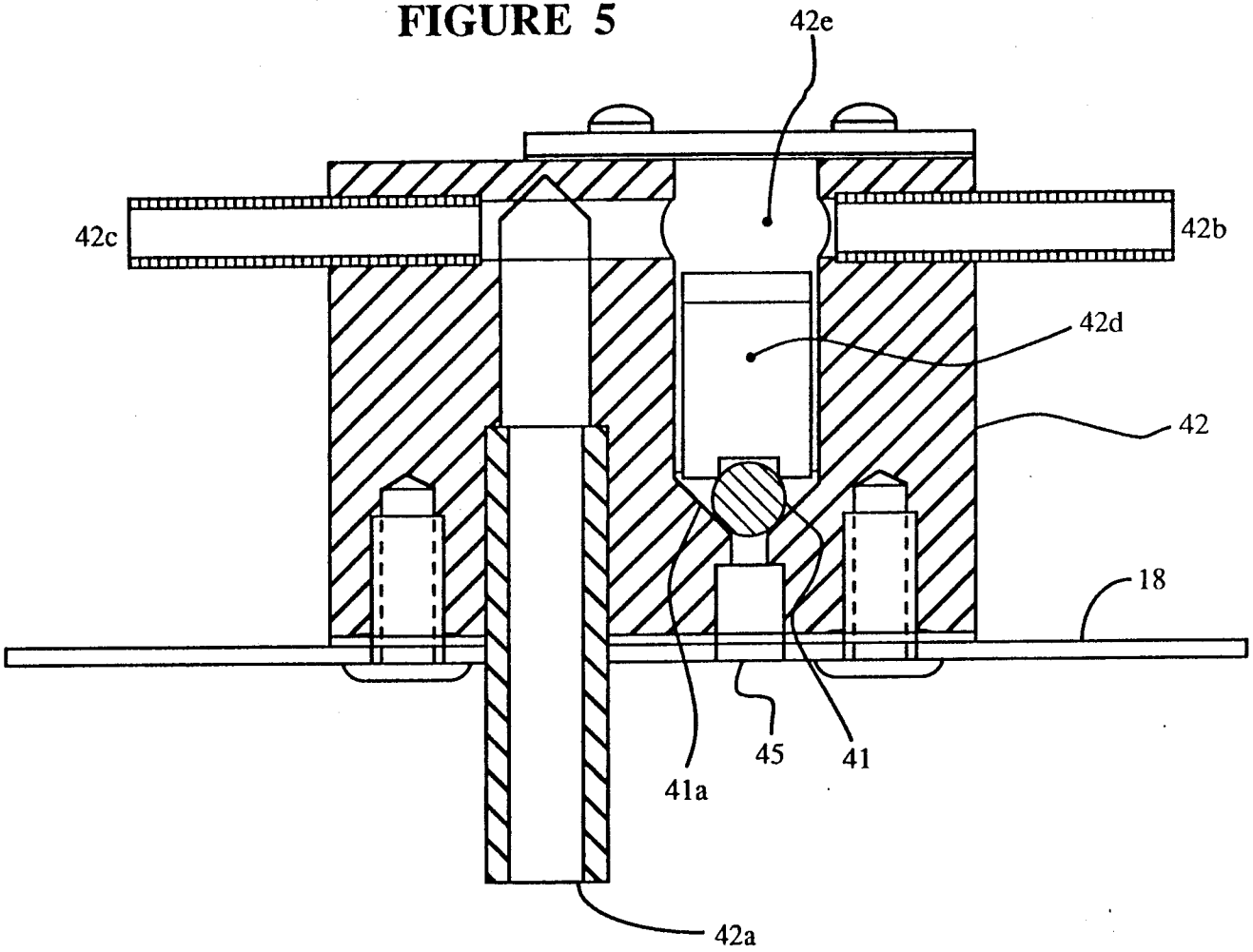
FIG. 5 shows a cross section of a vacuum controller manifold 42 in an enlarged section of a portion of a bottom mounting surface of the main tank 10 to aid in the explanation of the operation of the vacuum system and to operate the isopar liquid level control system.

A vacuum controller manifold 42 (FIG. 5) is located at the bottom of the "new" side of the toner station tank 10*m*. The vacuum controller manifold 42, in one embodiment, consists of a rectangular block of material, preferably steel, having an inner chamber 41 ported to a tubing fitting 42*a* designed to pass through the bottom floor of the toner station tank 10, then to connect to the liquid pump 28 intake via the mixer manifold 22; to also have dual tubing fitting ports 42*b*, 42*c* connecting the inner chamber 41 to tubing 42*e*, leading to the vacuum channel 18, and having a small orifice 42*d*, having a diameter of approximately 0.040", open to a slot 42*g* accessing the toner solution contained in the "new" toner station chamber 10*m*.

During normal operation the vacuum created by the fluid pump 28 is applied via the pass-through connection 42*a* to the inner chamber 41 of the vacuum controller manifold 42 where the vacuum is partially relieved by fluid flowing into the inner chamber 41 through the metering orifice 42*d* after passing through slot 42*g*. The resistance to flow in the fluid path from the vacuum controller manifold 42 to the pump 28, including the resistance across the metering orifice 42*d*, results in there being a residual vacuum of approximately 35" of isopar available at the distribution ports 42*b*, 42*c* connected to the vacuum channel 18.

The vacuum channel 18 generally provides air which is sucked through its connections to the vacuum controller manifold 42, thereby partially relieving the vacuum in the vacuum controller manifold 42. When the paper 16 is covering the top of the vacuum channel 18, undeveloped toner solution is also sucked from the paper 16 and moves through the vacuum channel connections along with the air. The amount of fluid flowing from the vacuum channel 18 which passes through the vacuum controller manifold 42 is small relative to the maximum pumping capacity of the fluid pump 28. The pump 28 can develop a vacuum of approximately 95" of clear isopar solution, if connected directly to the vacuum channel and not relieved. Since such a large vacuum would create excessive paper drag at the vacuum channel/paper interface it is desirable to reduce vacuum pressure to around 35" of isopar, so that excess toner solution is sucked from the paper as it crosses the top of the vacuum channel 18 without creating excessive paper drag. This is accomplished by adjusting the amount of fluid flow allowed through the metering orifice 42*d* of the vacuum controller manifold 42 (as previously described) thereby adjusting the system's resistance to flow when combined with the sum of fluid flow resistances from other sources to provide a vacuum of approximately 35" of isopar at the vacuum channel 18.

The mixer manifold 22 (FIG. 2) consists of an upper chamber 80 and a lower chamber 82 separated by a restriction orifice 84. Two or more connections, openings, or ports are provided in each chamber 22*a, b, c, d, e*. Suction from the liquid pump 28 acting through a suction line 30 connected to a port 22*d* produces a vacuum in the upper chamber 80. Another port which is the "main" port 22*e* of the upper chamber 80 is connected to the vacuum control manifold 42 (not shown in FIG. 2). Toner solution and air (collectively known as "fluid") are drawn from the "new" toner station compartment 10*m* (FIG. 1A) and from the vacuum channel 18 through the vacuum control manifold 42 and through the upper chamber of the mixer manifold 80, and finally to the suction of the liquid pump 28. As toner solution and air flow from the vacuum channel 18 through the upper chamber of the mixer manifold 80 to the vacuum pump 28, several other fluids such as clear isopar solution and concentrated toner solution may be selectively added to the fluid mixture coming from the vacuum channel 18 as it passes through the upper chamber 80.

The vacuum in the upper chamber of the mixer manifold 80 causes fluid to flow into the upper chamber 80 from two openings, the "main" flow port 22*e* connected to the vacuum control manifold 42 and the mixer manifold restrictive orifice 84 connected to the lower chamber 82. A third port 22*a*, which receives an input of toner concentrate fluid from a concentrated toner solution pump 43, is also provided in the upper chamber of the mixer manifold 80.

The vacuum in the upper chamber assists the concentrated toner solution pump 43 by reducing its head requirement when the pump is in operation, but when the pump is stopped does not suck any concentrated toner solution into the upper chamber 80.

The lower chamber of the mixer manifold 82, during normal operation, is connected by tubing 40*a* to an air vent including an air bleed orifice 40 which allows air to flow into the lower chamber of the mixer manifold 82. This air is drawn through the mixer manifold orifice 84 by the vacuum in the upper chamber of the mixer manifold 80, generated by the fluid pump 28 and routed to the upper chamber 80 through a connection port 22*d*. The air bleed orifice 40, connected by vent tubing 40*a* to the lower chamber of the mixer manifold 82 allows air to flow into the lower chamber of the mixer manifold at a higher rate than air can be drawn across the restrictive orifice 84 into the upper chamber 80. This causes a substantially lower vacuum (i.e. higher pressure) in the lower chamber 82 than is present in the upper chamber 80.

When the air flow venting the lower chamber of the mixer manifold 82 is shut off by closing the air bleed orifice 40, the vacuum in the lower chamber 82 rises (i.e. the pressure falls), as a result of fluid flow across the restriction orifice 84, to be equal to the vacuum present in the upper chamber of the mixer manifold 80. A second port 22*c* of the lower chamber of the mixer manifold 82 is connected through tubing 78 and two ball-type check valves 76-1, 70 to an isopar supply container 68 containing clear isopar fluid 67. As the vacuum in the lower chamber of the mixer manifold 82 increases isopar fluid 67 is sucked, through the two ball-type check valves 76-1, 70 and tubing 78, into the lower chamber of the mixer manifold 82. From the lower chamber of the mixer manifold 82, the isopar solution 67 is sucked through the mixer manifold orifice 84 and into the upper chamber of the mixer manifold 80 where it mixes with the fluid flowing through the upper chamber 80 from the vacuum control manifold 42 and vacuum channel 18 to the liquid pump 28.

When the air bleed orifice 40 to the lower chamber of the mixer manifold 82 is reopened, the relatively high vacuum in the lower chamber of the mixer manifold 82 is relieved by air entering the air bleed orifice 40 and passing through the vent tubing 40*a* to the lower chamber 82 thereby stopping the flow of isopar fluid 67 from the isopar supply container 68. However, because of the ball-type check valves 76-1, 70 in the tubing 78, the isopar fluid 67 remains at a level int he tubing 78 equal to the lower chamber of the mixer manifold 82, such that when the air bleed orifice 40 is again closed, isopar 67 begins flowing nearly immediately from the isopar supply container 68.

The concentrated toner solution pump 43 which is connected to the the upper chamber of the mixer manifold 80 can be a commercially available solenoid pump or a tube pump. Either pump provides a metered quantity of concentrated toner solution 26 (an isopar solution having a pigment concentration of 30% as compared with normal toner solution having a pigment concentration of 2%) to the upper chamber of the mixer manifold 80 when a control signal indicates that additional toner pigment is required. Each control signal causes the pump to perform a pump cycle forcing a measured quantity of concentrated toner solution 26 into the pump discharge tubing 43*a* connected to the upper chamber of the mixer manifold 80.

When a tube pump is used the pump discharge tubing 43*a* and tube pump 43 also contain ball type check valves 43*b*, 43*c* to prevent back flow of the pumped concentrated toner solution. Thus, once the concentrated toner solution 26 has reached the level of the upper chamber of the mixer manifold 80, each pump cycle will cause a measured amount of concentrated toner solution 26 to be injected into the upper chamber of the mixer manifold 80 to mix with the fluid flowing from the vacuum control manifold 42 and vacuum channel 18 to the fluid pump 28 through the upper chamber of the mixer manifold 82.

As the fluid flows in the tubing from the upper chamber of the mixer manifold 82 to the fluid pump 28 and subsequently from the fluid pump 28 into the "old" solution chamber 10*r* of the main tank 10, its flow through the tubing will thoroughly mix the newly introduced isopar liquid and/or concentrated toner solution with the used toner solution scavenged from the vacuum channel 18 and with the "new" toner solution drawn into circulation at the vacuum controller manifold 42 from the "new" side of the toner solution tank.

Figure 3:
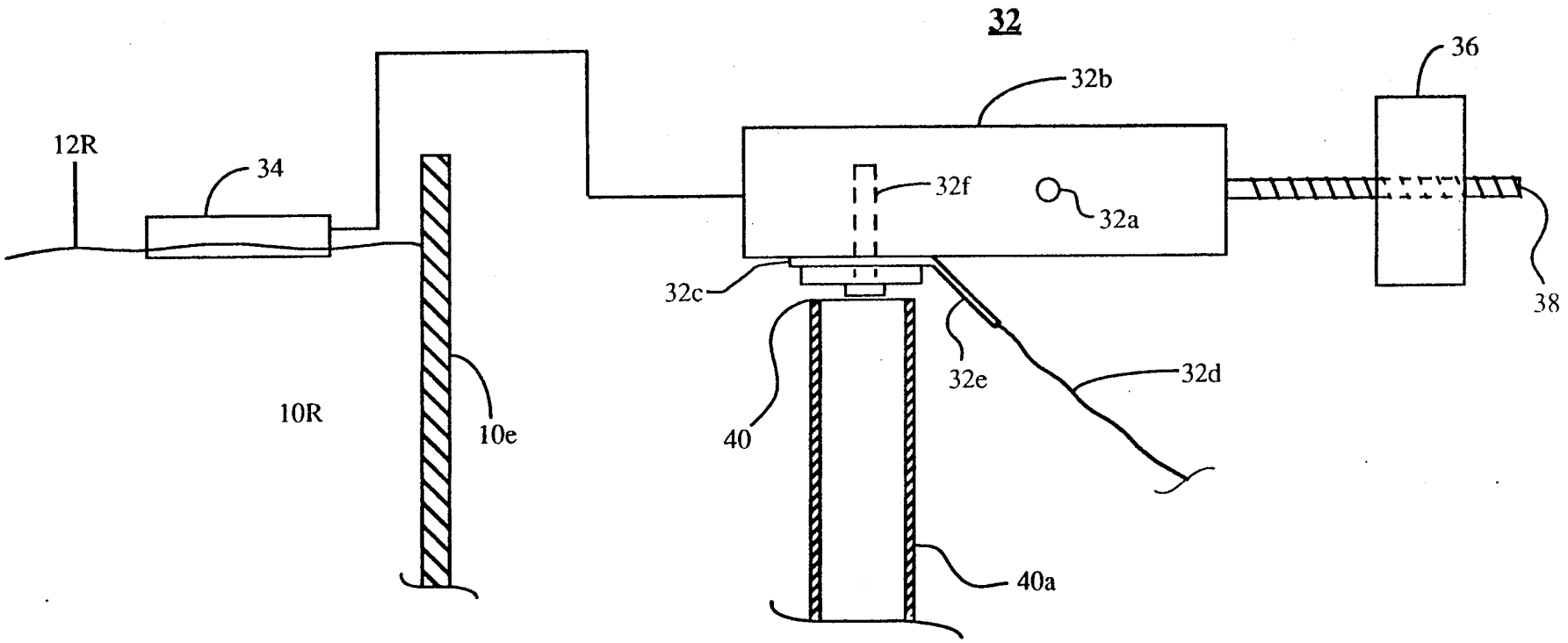
FIG. 3 is an enlarged side view of a portion of an assembly illustrating the operation of the pivot block assembly of the toner circulation apparatus.

The level of the toner fluid 12 in the recirculating solution chamber 10*r* of the main tank 10 (FIGS. 1*a*, 1*b*) is maintained substantially constant by adding clear isopar liquid 67 by controlling the opening of the air bleed orifice 40 to the lower chamber of the mixer manifold 82 by a vent control means (FIG. 3) which comprises a pivot block mechanism 32 and a float 34. The lower chamber of the mixer manifold 82 is connected to and receives an air supply from a vertically disposed conductive, i.e., copper, steel, etc., electrically grounded open tube 40*a* adjacent to the recirculating chamber 10*r* of the main tank which forms an air bleed orifice 40. This air supply is controlled by opening and closing the air bleed orifice 40 by means of the pivot block mechanism 32 that is responsive to a float 34. The float 34 is supported by the toner solution level 12*r* in the recirculating tank chamber 10*r*. The float linkage is connected over an edge of the chamber 10*e* to the pivot block 32*b* at one end while, at the other end of the block 32*b*, a weight 36 counter balancing the float is provided on a threaded shaft 38 coupled to the block 32*b*. The weight 36 is threadably connected on the shaft 38 so that the position of the weight 36 is adjustable by turning it on the shaft 38. The moment of the float 34 about a pivot pin 32*a* is made to be nearly equal to the opposite moment of the weight 36, with the float side being heavier, in one embodiment by two (2) grams. When the toner solution level 12*r* in the recirculating chamber 10*r* is normal, the float 34 and shaft 38 are horizontal and the toner solution supports the float despite the 2 gram weight bias. However, if the level of the toner solution 12*r* in the recirculating tank chamber 10*r* drops, then the float 34 also drops. This causes the air bleed orifice 40 supplying air to the lower chamber of the mixer manifold 82 to be closed increasing the vacuum in the lower chamber 82 ultimately causing fresh isopar liquid 67 to be conducted into the recirculating tank chamber 10*r*.

If the supply of clear isopar fluid 67 is exhausted or the clear isopar fluid makeup system somehow malfunctions, a system is provided to sense and alarm this condition. The pivot block 32*b* which must be made from an insulating material, such as plastic, has an electrically conductive gasket 32*c*, made from silver bearing rubber for example, attached to it. The gasket 32*e* seals the open end of the air tube 40*a* and air bleed orifice 40 that provides an air supply to the lower chamber of the mixer manifold 82. A conductive wire 32*d* with a positive potential, of say plus 5 volts, is applied to the conductive gasket 32*c* through an electrically conductive contact 32*e* and an electrically conductive screw 32*f*. When the toner solution level 12*r* in the recirculating chamber 10*r* drops causing the float 34 to drop and close the end of the air bleed orifice 40 supplying air to the lower chamber of the mixer manifold 82, the potential connected to the wire 32*d* is grounded as a result of the conductive gasket 32*c* sealing against the grounded vent tube, 40*a* and orifice 40, which starts a timer (not shown). There is a hysteresis associated with the change in solution level required to open and close the air vent (i.e., the level in the tank has to rise high enough to overcome the suction of the vacuum sealed gasket before the vent can open). It takes several minutes to replenish the "old" side tank level 12*r* from the isopar supply 67, because the flow rate of isopar into the circulating system is small, about 10 milliliters per minute. The float 34 must be raised to release the conductive gasket 32*c* from the end of the air bleed orifice 40 and air supply tube 40*a*, thereby restoring the positive potential in the system. If the "old" side tank level does not normalize within a predetermined time, i.e., 7 minutes, then the timer monitoring the time that the vent orifice is closed will cause an alarm to be generated to indicate that a system malfunction or depletion of the isopar supply has occurred.

While "old" side tank level 12*r* is monitored to control the feed of clear isopar fluid 67, the control of the concentration of toner pigment in the toner solution 12 in the main tank 10 is done by outside circuitry (not shown) which counts the number of electrode locations (dots) energized on the papers 16 which cross the charging head in the paper path 16*a* before the applicator roll 14. It is known that a specific amount of toner pigment is required to develop a specific number of charged electrode locations. The number of electrode locations energized on the paper which passes through each color system are counted and when the number of electrode locations for any color corresponds to the amount of toner pigment contained in the concentrated toner solution 26 which would be pumped in one cycle of the concentrated toner solution pump, a pump initiating signal is generated causing the pump to cycle and provide the required makeup toner pigment. The concentrated toner solution 26 is pumped into the upper chamber of the mixer manifold 80 and is thereby injected in the stream of fluid flowing from the vacuum control manifold 42 through the upper chamber of the mixer manifold 80 and the vacuum pump 28 to the "old" solution chamber 10*r* of the main tank 10.

With reference to FIGS. 2, 4*a*, 4*b*, 4*c* and 4*d*, a tube pump comprising a pump tube 44 and probe tube 46 is immersed in a bottle 24, which has a concentrated toner solution 26 of a desired color and concentration (i.e. cyan, magenta, yellow, and blue; and 30% pigment, 70% isopar).

The pump tube 44 is comprised of an inside tube 44*a* of a predetermined length with its opening 44*f* at the bottom end fitted to a lower piston 44*b* and its opening 44*g* at the top fitted with an upper piston/armature 44*c* with an upper ball 62 disposed inside the inside tube 44*a* and normally sealing the top end of a fluid passage 44*i* in the lower piston 44*b*. A concentrate outlet 44*e* is provided in the bottom portion of the inside tube 44*a* to permit the fluid pressurized inside the tube to escape. A rod 44*d* engages a vertical hole in the upper piston/armature and extends out an upper pump housing 43*d* of the tube pump 43 through a rod guide 43*e*.

The probe tube 46 is comprised of an outer tube 46*a* and a concentrate foot valve 43*c* at the bottom end. The probe tube 46 has a continuous inner surface while having a shoulder 46*b* on its outer surface to engage a lower coil ring 49*a* mounted on the shoulder 46*b*. A pump outlet opening 46*c* extends through the side of the outer tube 46*a*, through the lower coil ring 49*a*, and the coil housing 49 to provide an outlet for the pumped concentrated toner solution.

A bobbin 48*a* made of an insulating material such as nylon or phenolic is located above the lower coil ring 49*a* on the narrow portion of the outer tube 46*a*. The top of the bobbin 48*a* is even with the top end of the outer tube 46*a*. An upper coil ring 49*b* having a central stub shaft 49*c* with a crater type relief 49*d* at the end of the shaft is disposed with the central stub shaft 49*c* inside the top of the outer tube 46*a* facing down. A hole in the center of the upper coil ring 49*b* allows the rod 44*d* to freely pass through. A coil 48 comprised of wires 48*b* wrapped around the bobbin 48*a* is located inside a coil housing 49, which extends from the lower coil ring 49*a* to the upper coil ring 49*b* and slightly beyond to engage the upper pump housing 43*d*. A printed circuit board 51 (P.C.) (FIG. 4*d*) is supported by said upper coil ring 49*b*, by mounting screws 55, shown in FIG. 4*d*. Connections from the P.C. board to other devices are made by using the terminals 51*b*.

Figure 4A:
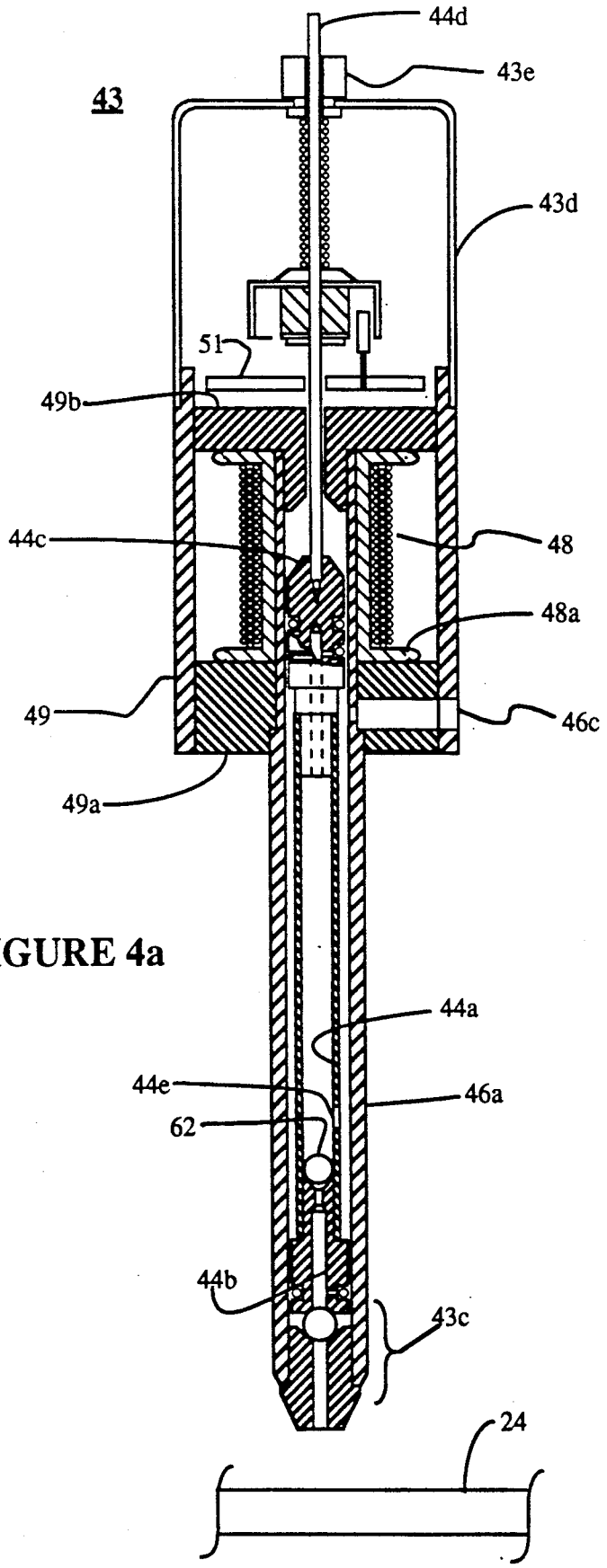
FIG. 4*a* is a sectional elevation view showing the details of the concentrated toner solution tube pump 43 used in the concentrate supply bottle 24, illustrated in FIG. 2.
Figure 4B:
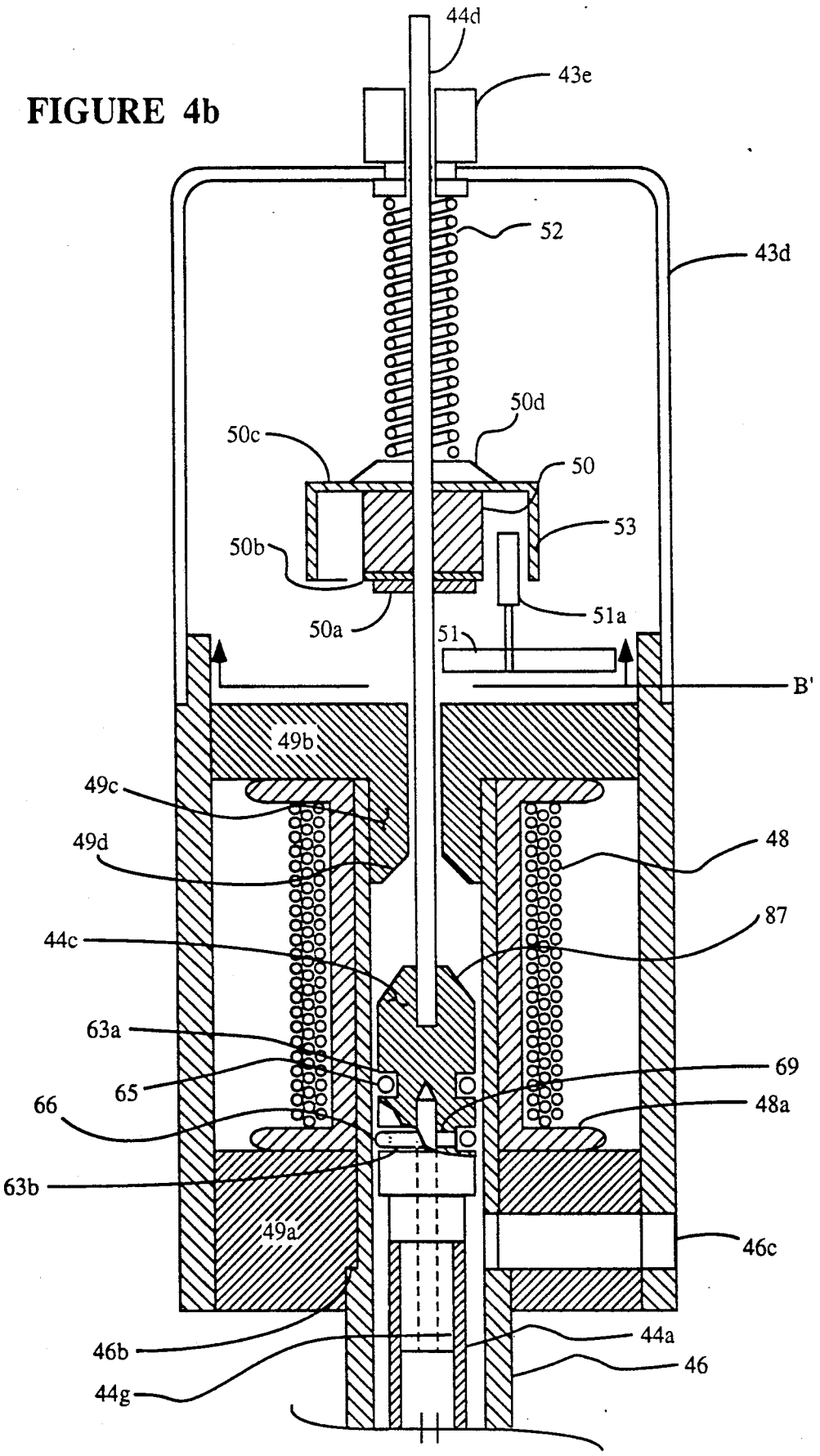
FIG. 4*b* is a blowup of the top portion of the pump 43 pictured in FIG. 4*a;*
Figure 4C:
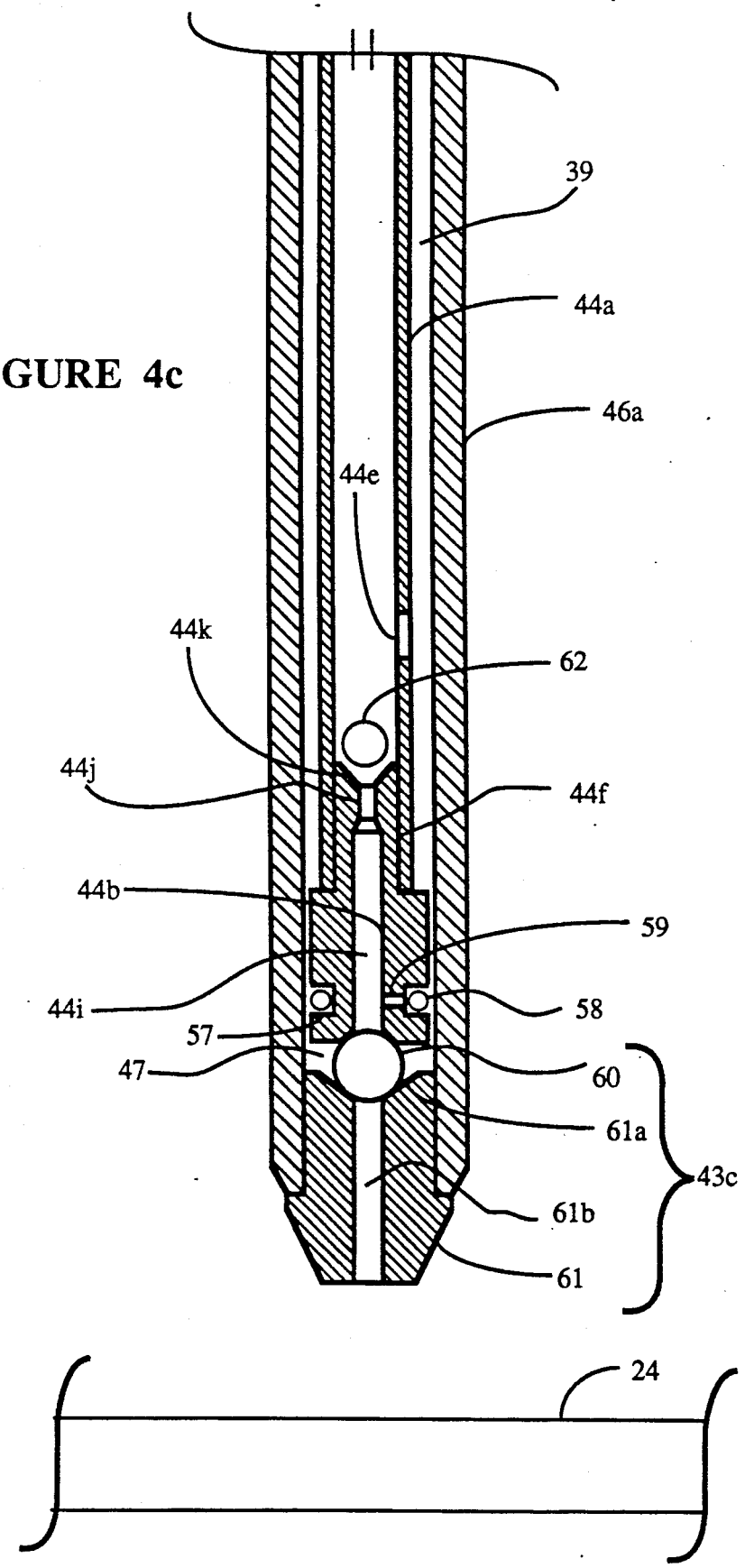
FIG. 4*c* is a blowup of the bottom portion of the pump 43 pictured in FIG. 4*a;*
Figure 4D:
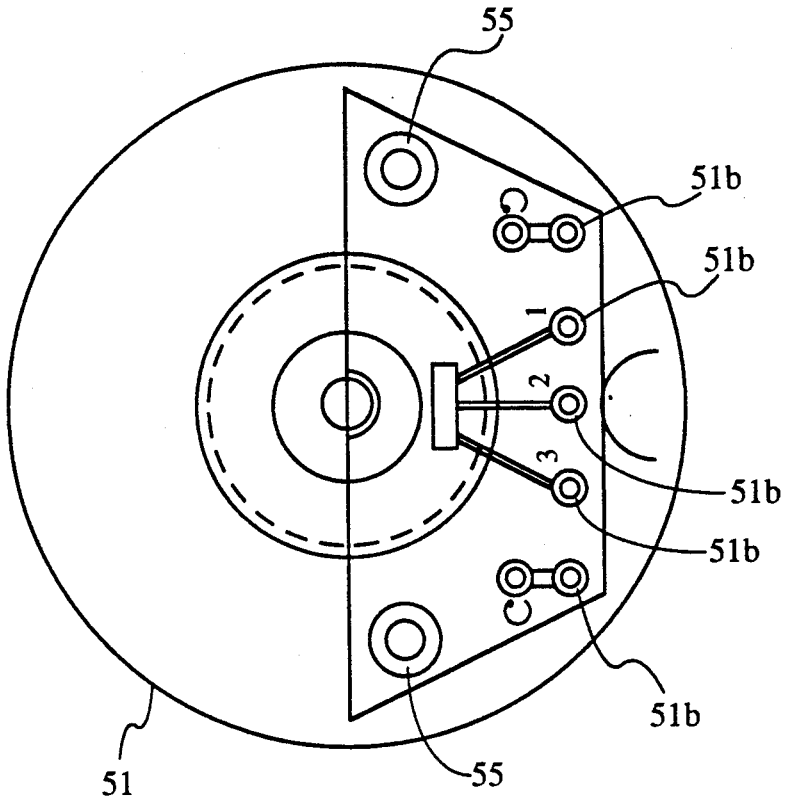
FIG. 4*d* is a sectional plan view of FIG. 4*b* as cut at Section "B" in FIG. 4*b;*

A Hall circuit 51*a* extends from said P.C. board 51 adjacent to the rod 44*d*. On the rod 44*d* adjacent to the Hall device 51*a* is mounted an annular magnet 50 (made of barium ferrite for example). The magnet 50 is disposed on said rod 44*d* by means of a locking ring 50*a* supporting a ferrous washer 50*b* which focalizes the south pole of the magnet on which the magnet 50 sits. On top of the magnet 50 sits a flux cup 50*c* which carries the north pole of the magnet to the lateral side of the Hall device 51*a*. This configuration provides a magnetic flux perpendicular to the Hall device 51*a* necessary for the Hall device's operation. The flux cup 50*c* is secured against the magnet 50 by the urging of a spring washer 50*d* which prevents the magnet 50 and flux cup 50*c* from moving up, as shown in FIGS. 4*a*, *b*, *c*. A spring 52 is located around the rod 44*d* between the top of the spring washer 50*d* and the inside of the pump housing 43*d* resting against the rod guide 43*e*.

The probe tube's foot valve 43*c* is comprised of an end piece 61 disposed in the end of the outer tube 46*a* having a centrally located fluid passage 61*b* with a crater like seating surface 61*a* for sealing the fluid passage 61*b* on the top of said end piece 61 such that when a lower ball 60 is urged (by gravity, direct contact, or fluid pressure) against the seat 61*a*, the passage 61*b* will be sealed and fluid will not flow.

The inside tube 44*a* has a lower piston 44*b* engaged in its bottom end. The lower piston 44*b* has a central fluid passage 44*i*; similar to the end piece 61 except that a narrowing 44*j* of the fluid path exists (to provide additional resistance to prolong each liquid pump cycle for monitoring purposes) just prior to reaching the crater like seat 44*k* at its top which will seat an upper ball 62 when pressure inside the inside tube 44*a* is greater than the pressure in the pumping chamber 47 (the variable volumetric space between the ball seat 61*a* of the foot valve in the end piece 61 and the ball seat 44*k* of the lower piston 44*b*). To prevent fluid leakage past the lower piston 44*b* during its movement up and down inside the outer tube 46*a*, it has a circumferential groove 57 for an O-ring 58 which is ported 59 to the pump chamber 47 which provides a good seal during operation. The porting 59 of the O-ring to the pump chamber 47 assists in expanding the O-ring to improve sealing.

The upper piston/armature 44*c* is engaged with the top of inside tube 44*a*. Two sets of grooves 63*a,b* and O-rings 65, 66 seal its circumference against the inside of the outer tube 46*a*. The lower set 63*b*, 66 is ported 69 to the fluid pressure inside the inside tube 44*a* thus expanding the O-ring to improve sealing. The upper piston/armature 44*c* is made of a magnetic material, i.e., iron, steel, suitable for use as a solenoid armature. The top of the upper piston/armature 44*c* is configured in a conical shape 87 with a means to engage the rod 44*d* at its center, the conical shape 87 matching the crater type relief 49*d* at the bottom of the stub shaft of the upper coil ring 49*b*. When the coil 48 is energized the upper piston/armature 44*c* moves upward to meet with the bottom of the stub shaft of the upper coil ring 49*b*, thereby pulling up the inside tube 44*a* and the lower piston 44*b*.

To effect pumping, the bobbin 48*a* and coil 48 are operatively disposed to the upper piston/armature 44*c*. When the coil 48 is energized by an applied pulse (FIG. 6) (the source of which is not shown), the upper piston-/armature 44*c* and connected pump tube 44 are attracted toward the coil. The magnetic flux created by the energized coil draws the pump tube 44 upwards, and compresses the spring 52. The upstroke of pump tube causes the pump chamber 47 to expand and draw concentrated toner solution 26 into the bottom of the probe tube 46*a*. At the end of the pulse, which may be a 24 volt DC pulse of 300 milliseconds in duration, the coil 48 is de-energized and the compressed spring 52 pushes down on the pump tube 44 through its rod 44*d*. As the pump tube 44 is urged downward toward its de-energized position the pressure built up within the probe tube 46*a* forces concentrated toner solution to incrementally flow from the pumping chamber 47 through the lower piston orifice 44*j* into the inside tube 44*a*, then through the tube hole 44*e* into the annular space 39 between the outer tube 46*a* and the inside tube 44*a* and then eventually out the pump outlet opening 46*c*. An O-ring 58 is disposed in a circular slot 57 on the outside of the lower piston 44*b* which is ported to the fluid passage in the lower piston 44*i*. Pumping pressure created during a pump cycle expands the O-ring seal 58 and provides a tight seal with the I.D. of the outer tube 46*a*, which prevents the escape of the solution, and causes the solution to flow into the pumping chamber 47 from the concentrate supply bottle 24 through the foot valve 43*c* in the end of the probe tube 46*a* rather than from the annular space 39 between the two tubes 44*a*, 46*a* on the pump tube 44*a* upstroke.

The tube pump 43 is self priming as it is immersed in solution to be pumped. However, a plurality of strokes are required when the system is empty before concentrated toner solution 26 reaches the upper chamber of the mixer manifold 80. A ball type check valve 43*b* is located in the tubing just outside the tube pump 43 to assist in preventing any fluid from returning from the mixing chamber 80 to the tube pump 43 and to insure that the concentrated solution immediately enters the mixer manifold 22 when a pump cycle occurs Each pump cycle pumps the same volume of fluid and in this way a tube type metering pump is provided.

The toner solution that is supplied from the mixer manifold 22 to the "old" solution chamber 10*r* of the main tank 10 selectively comprises a mixture of toner concentrate obtained from the supply container 24 and an isopar carrier fluid that is obtained from an isopar supply container 68 in addition to the fluid drawn from the vacuum chamber 18. The isopar container 68 holds a clear isopar liquid which is a fractionated hydrocarbon, having a specific density of about 0.78 for example. The isopar container 68 has a foot valve 70 submerged in the isopar liquid. The ball type foot valve 70 provided, for example, includes a ball 70*a* to prevent isopar liquid from falling back into the supply container 68 after it has been withdrawn. A distribution manifold 74 that is positioned at the top of the isopar bottle 68 has four ball type check valves 76-1 to 76-4, one for each of four toner colors, blue, cyan, magenta and yellow, respectively, to keep the isopar fluid within the tubes 78 that lead to the lower chamber of the various colors mixer manifolds. The tube 78, which is represented by a dashed line (FIG. 2), remains full of isopar at all times so that when a demand is made by the apparatus for more isopar, isopar is readily available. It should be noted that the present description is directed to printing one color such as blue on the paper, and that the three other tubes associated with the ball valve assembly 76 are tied to respective supplies of cyan, magenta and yellow, by way of example, for separate printing of the different colors on the paper.

During operation of the apparatus, the fluid pump 28 provides a vacuum through the vacuum line 30 to the upper chamber 80 of the mixer manifold 22. The upper chamber 80 is freely ported to the vacuum channel 18 via a vacuum controller manifold 42 and is coupled to a lower chamber 82 via a small restriction orifice 84. The lower chamber 82 is connected by a vent tube 40*a* to the air bleed orifice 40 in the pivot block assembly 32 of the main tank 10. When the air bleed orifice 40 is closed at the pivot block 32*b*, the vacuum in the lower chamber 82 increases to draw isopar fluid 67 by vacuum suction from the supply bottle 68 past the ball type check valves 70, 76-1 and through the mixer manifold orifice 84 into the upper chamber of the mixer manifold 80. The clear isopar is mixed with the toner solution, including the concentrated toner solution, that is circulated through the upper chamber 80. For maintenance a clean-out plug 23 in the mixer manifold can be removed to enable cleansing of the manifold 22.

With reference to FIGS. 2 and 4*a*, 4*b*, and 4*c* the detailed structure of the pumping mechanism for the concentrated toner supply assembly is shown. The tube pump 43 is coupled by a tube 43*a* to the upper chamber 80 of the mixer manifold 22 to provide concentrated toner solution to the mixer manifold 80 monitored by a Hall effect sensor 53. A Hall effect sensor 53, which effectively acts as a solid state magnetically operated switch, is mounted to the Hall circuit extension of a PC board 51 adjacent to a rubber magnet 50 that is seated on a rod 44*d*. A flux cup 50*c* is magnetically coupled to the magnet 50 and projects magnetic flux to the Hall effect sensor 53, thereby producing a magnetic flux field that is perpendicular to the face of the Hall sensing device 53.

Figure 6:
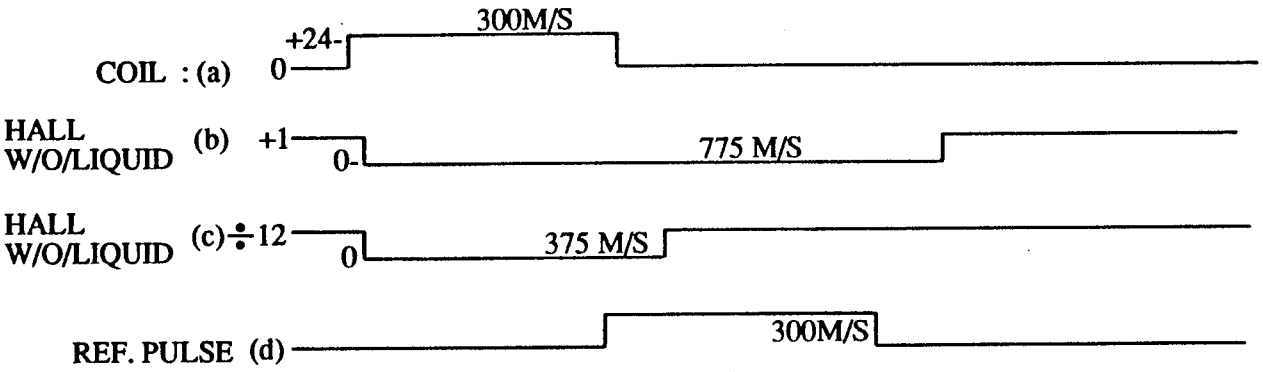
FIG. 6 is a series of waveforms to aid in the explanation of the operation of a Hall effect device associated with the tube pump in the concentrate supply bottle.

When the pump assembly is in a quiescent state, i.e., when the upper piston/armature 44*c* and pump tube 44 are in the downward position under the force of the spring 52, the Hall device is on. When a pump activation signal is provided to the coil 48, as shown in FIG. 6, the upper piston/armature 44*c* and pump tube 44*a* are raised towards the top of the pump thereby lifting the magnet 50 and the flux cup away from the Hall device 53 turning the Hall device 53 off approximately 20 milliseconds after the coil 48 is energized, as shown in FIG. 6. The pump/coil activation signal is provided for approximately 300 milliseconds. If concentrate liquid is present in the pump chamber of the probe tube 46 when the coil is turned off, the pump tube 44 will return to its home position after approximately 475 milliseconds, thereby turning the Hall device back on. If concentrate liquid is not present in the pumping chamber 47 of the probe tube 46 when the coil is turned off, the pump tube 44 will return to its home position after only about 75 milliseconds, thereby turning the Hall device 53 back on. A 300 millisecond long reference pulse is activated by deenergization of the pump coil. If the reference pulse is active at the same time that the Hall device 53 is on, as will happen when no concentrate liquid is present in the pump chamber of the probe tube 46, then an alarm is activated to notify the operators that there is a problem with a pump and/or that the concentrated toner solution supply has been depleted.

A sound barrier 90 is provided to encompass the vacuum pump 28 so that any noise from the pump is minimized.

The toner supply circulation apparatus disclosed herein has been found to be simpler and less expensive to make and maintain than prior art apparatus of this type. No large external pump is needed and toner material is provided optimally for development of a latent image.

While the invention has been described in terms of a toner supply circulation apparatus, those skilled in the liquid pumping arts will recognize that the particular structure disclosed can also be used in other applications where it is necessary to pump a fluid from one place to another.

The above description is meant to be illustrative only and not limiting. Other embodiments of this invention may be apparent to those skilled in the art in view of the above disclosure.

What is claimed is:

1. A toner supply circulation apparatus for an electrostatic imaging system in which a latent image is developed on a medium comprising:

means for supplying toner concentrate;

means for supplying a carrier;

a mixer manifold for receiving and mixing said toner concentrate and said carrier to produce a toner solution; and vacuum means coupled to said mixer manifold for establishing a vacuum in said manifold and transferring said toner solution to a destination.

2. A toner supply circulation apparatus as in claim 1 wherein said means for supplying toner concentrate includes a supply container containing a level toner concentrate liquid, a pump tube disposed at least partially below the level of said concentrate liquid, electrical means coupled to said pump tube for generating a pumping action within said container to produce a pressure so that concentrate liquid flows through said pump tube to said mixer manifold.

3. A toner supply circulation apparatus as in claim 2, wherein said electrical means comprises a movable core constructed of magnetic material surrounded by an electrical coil which when energized causes said core to move.

4. A toner supply circulation apparatus as in claim 2, further comprising a central bore formed in said pump tube; and ball valve means for controlling the flow of concentrate liquid in said bore so that concentrate liquid does not flow from said bore back to the supply of concentrate liquid.

5. A toner supply circulation apparatus as in claim 3, further comprising a piston coupled to said core for providing a pumping action within said pump tube.

6. A toner supply circulation apparatus as in claim 1 wherein said means for supplying a carrier includes a supply container containing said carrier; and a carrier draw tube disposed in said carrierin said container.

7. A toner supply circulation apparatus as in claim 6, including a foot valve disposed within said draw tube and carrier to prevent the flow of carrier back to said carrier supply container.

8. A toner supply circulation apparatus as in claim 7, further comprising a ball check valve assembly between said carrier draw tube and said mixer manifold.

* * * * *